May 13, 1969 M. L. SASSLER 3,444,393

ELECTRONIC INTEGRATOR CIRCUITS

Filed March 31, 1966

INVENTOR.
MARVIN L. SASSLER
BY Philip M. Bolton
ATTORNEY

United States Patent Office 3,444,393
Patented May 13, 1969

3,444,393

ELECTRONIC INTEGRATOR CIRCUITS

Marvin L. Sassler, Preakness, N.J., assignor to International Telephone and Telegraph Corporation, a corporation of Delaware Filed Mar. 31, 1966, Ser. No. 539,111
Int. Cl. G06g 7/38
U.S. Cl. 307—229 2 Claims

ABSTRACT OF THE DISCLOSURE

An integrating circuit wherein the collectors of two complementary transistors are connected serially, the power for said transistors being provided by two equal power supplies of opposite polarity, one connected to each emitter via a parallel combination of a capacitor and a resistor. An input voltage is applied to the bases of both said transistors simultaneously, and a capacitor is connected to the junction of said collectors, the charge stored on said capacitor being proportional to the time integral of said input voltage. In another embodiment of the invention the power supplies are connected to the transistors by Zener diodes rather than the parallel combination of capacitors and resistors, and a resistor is connected between the emitters.

This invention relates to electronic integrator circuits and more particularly to transistorized integrator circuits utilizing complementary current generators.

The main object of this invention is to provide an accurate integrator circuit that is less complicated than the prior art circuits and which has a high enough frequency response for use in servo-control systems.

According to this invention, an integrator circuit comprises first and second controllable current generators coupled together in series, to a capacitor, and an input circuit for coupling an input signal to said generators, said input circuit including means responsive to a positive input signal for increasing the conduction of one of said generators relative to the other of said generators and means responsive to a negative input signal for increasing the conduction of said other generator relative to said one generator. Further provided is means coupling said capacitor to said generators to cause said capacitor to charge responsive to one of said generators increasing conduction and to discharge responsive to the other of said generators increasing conduction, the voltage across said capacitor being proportional to the integral of said input signal.

Figure 2:
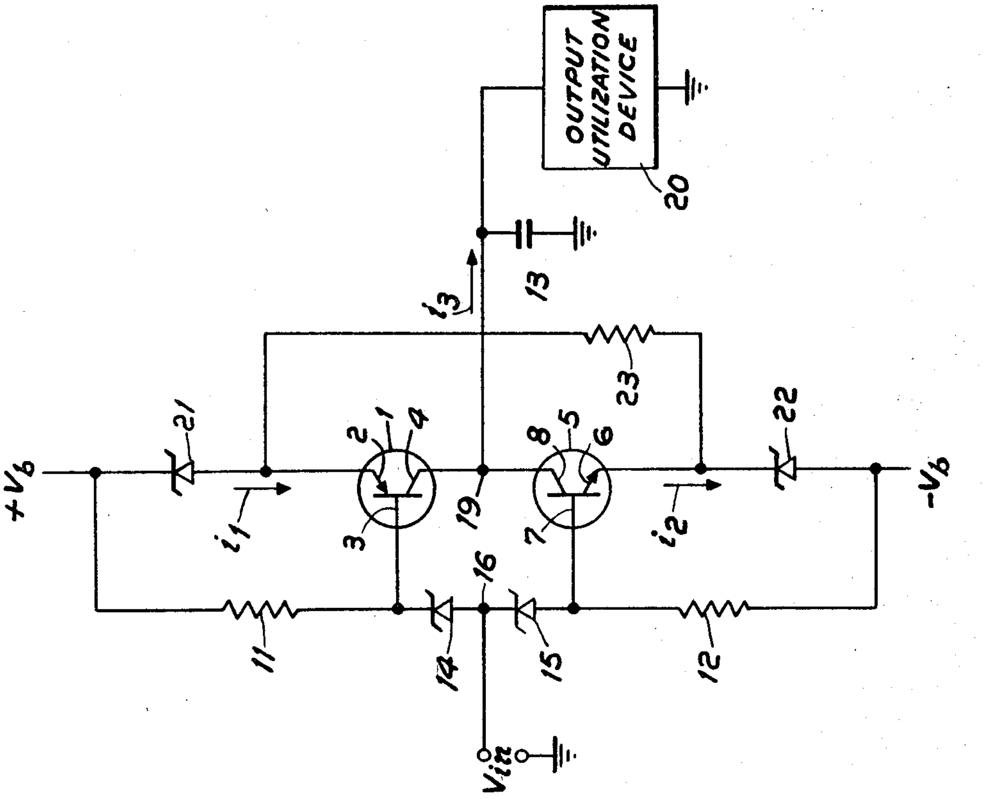
Figure 1:
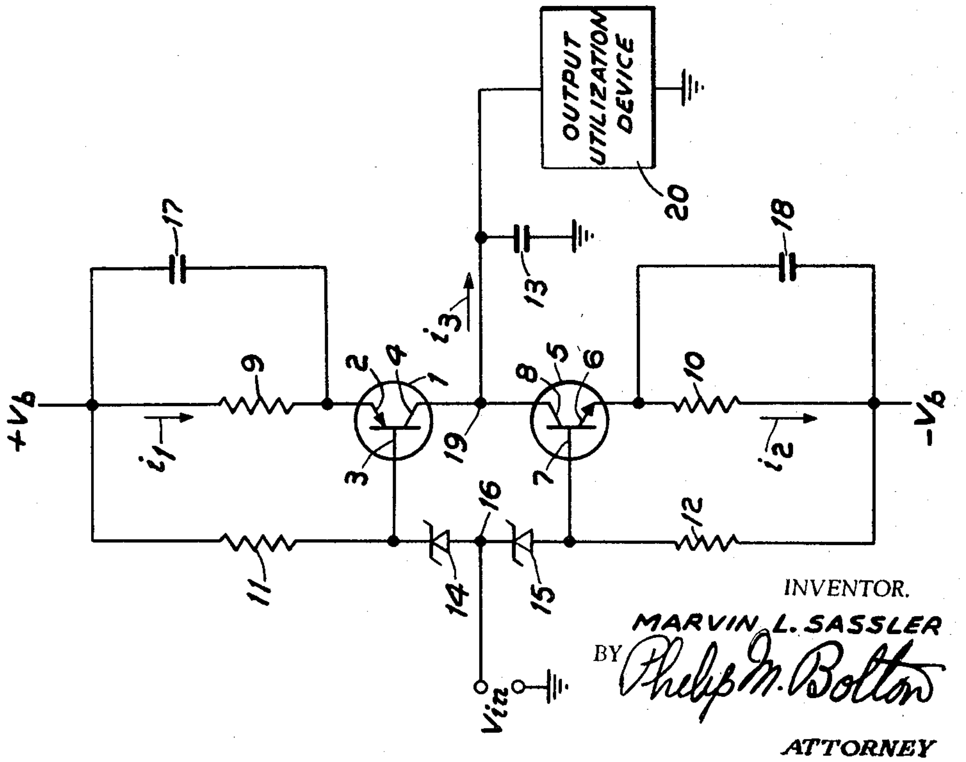

The above mentioned and other objects of this invention will become apparent by reference to the following description taken in conjunction with the accompanying drawings, in which:

FIGURE 1 is a schematic diagram of a preferred embodiment of this invention; and FIGURE 2 is a schematic diagram of an alternate embodiment of this invention.

Referring to FIGURE 1, the emitter 2 of transistor 1 is coupled to positive D.C. potential $+V_b$ via resistor 9 and the emitter 6 of transistor 5 is coupled to negative D.C. potential $-V_b$ via resistor 10. The collectors 4 and 8, of transistors 1 and 5, respectively, are coupled together and are further coupled to one terminal of capacitor 13, the other end of capacictor 13 being coupled to ground potential. The base 3 of transistor 1 is coupled to the cathode of input diode 14 and to the positive D.C. potential $+V_b$ via biasing resistor 11 and the base 7 of transistor 5 is coupled to the anode of input diode 15 and to the negative D.C. potential $-V_b$ via biasing resistor 12. The cathode of diode 15 is coupled to the anode of diode 14 at junction

16, the input signal being applied at said junction 16. Diodes 14 and 15 are shown in FIGURE 1 as Zener breakdown diodes but it is clear that any type of diode may be designed into the inventive circuit by one reasonably skilled in the art. In order to increase the frequency response of this circuit capacitors 17 and 18 are coupled across emitter resistors 9 and 10, respectively. The output of the circuit is taken across capacitor 13.

Operationally, transistors 1 and 5 are biased so that when the input signal $V_{in}$ applied to terminal 16 is zero the currents $i_1$ and $i_2$ flowing through emitter resistors 9 and 10, respectively, are equal. Therefore, the current $i_3$ flowing into capacitor 13 is equal to zero (the difference between $i_1$ and $i_2$). As the input signal $V_{in}$ is increased in the positive direction $i_2$ will increase and $i_1$ will decrease, thereby causing current to flow out of capacitor 13 towards junction 19, drawing charge out of capacitor 13. Alternatively, when the input signal $V_{in}$ is less than zero $i_1$ will increase and $i_2$ will decreases, thereby causing current $i_3$ to flow into capacitor 13, accumulating charge therein. As will be shown, the voltage across capacitor 13 is proportional to the integral of the input voltage applied at terminal 16. The equations for the operation of this circuit are below.

(1)
$$i_1 = I_{1_{dc}} - \frac{\Delta V_{in}}{R_e}$$

(2)
$$i_2 = I_{2_{c}} + \frac{\Delta V_{in}}{R_e}$$

(3)
$$i_3 = i_2 - i_1 = \frac{2\Delta V_{in}}{R_e} + I_{2_{dc}} - I_{1_{dc}} = \frac{2\Delta V_{in}}{R_e}$$

where $$I_{1dc} = I_{2dc}$$

(4)
$$V_{out} = \frac{1}{C_o}\int_0^t i_3 dt = \frac{2}{C_o R_e}\int_0^t \Delta V_{in} dt$$

(5)
$$\therefore V_{out} = K\int_0^t V_{in} dt$$

From the above, it is seen that this device performs a time integration of the input voltage.

As seen from Equation 5, when $V_{in}$ goes to zero, $i_1$ equals $i_2$ and the charge on capacitor 13 is held substantially constant. This results in an effective infinite gain and zero frequency. Note that this is only true if the input impedance of the output utilization circuit 20 is sufficiently high.

The frequency response of the integration performed by the instant circuit is a constant 6 db/octave fall. In order to increase the frequency response, additional capacitors 17 and 18 are coupled across emitter resistors 9 and 10, respectively. The addition of these capacitors does not adversely effect the operation of the circuit but does provide a better frequency response.

Referring now to FIGURE 2 it is seen that the circuit illustrated therein is essentially the same as the circuit of FIGURE 1 except that diodes 21 and 22, replace resistors 9 and 10, respectively, and resistor 23 is coupled between the emitters of transistors 1 and 5. Note also that there are no provisions for adding frequency extending capacitors 17 and 18. The components of FIGURE 2 are given the same reference numerals as their corresponding components in FIGURE 1 wherever applicable. The operation of the circuit of FIGURE 2 is essentially the same as that of FIGURE 1 except that there is a dead-span of input voltage, during which the output voltage across capacitor 13 will not change. Another difference in operation is that the output voltage across capacitor 13 is not directly proportional to the integral of the input voltage $V_{in}$. This is due to the fact that diodes replace the emitter resistors of FIGURE 1, thereby causing the transistors to be either on or off at any particular time instead of operating linearly.

Some uses for integrator circuits according to this invention is in servo mechanism loops and in phase-locked loop circuits in communication and tracking receivers. In such applications, the simplicity of the circuit adds to its desirability. In the circuit of FIGURE 1, by placing capacitors 17 and 18 across emitter resistors 9 and 10, respectively, the fall off rate of the frequency response can be controlled to provide the desired response by using the proper value of capacitor. Another application of the instant device is in automatic gain control circuits.

If a higher gain is desired the circuit of FIGURE 2 may be utilized. In this circuit, the price that one pays for the higher gain is having a dead-span of input voltage and having a non-linear response. That is, that the voltage across capacitor 13 is not directly proportional to the integral of the input voltage $V_{in}$. However, in most servo loop applications the above two disadvantages are compensated for in that a much higher gain is obtained.

While I have described above the principles of my invention in connection with specific apparatus, it is to be clearly understood that this description is made only by way of example and not as a limitation to the scope of my invention, as set forth in the appended claims.

I claim:

1. An integrator circuit comprising:

a first controllable current generator including a first transistor and a source of positive DC potential;

a second controllable current generator including a second transistor complementary to said first transistor and a source of negative DC potential connected in series with said first current generator;

a capacitor;

an input circuit including;

means coupled to said generators responsive to a positive input signal for increasing the conduction of one of said generatirs relative to the other of said generators;

means coupled to said generators responsive to a negative input signal for increasing the conduction of said other of said generators relative to said one of said generators;

means coupling the collector-electrode of said first transistor to said capacitor;

means coupling the base electrode of said first transistor to said input circuit;

means coupling the emitter-electrode of said first transistor to said source of positive potential;

means coupling the collector-electrode of said second transistor to said capacitor;

means coupling the base electrode of said second transistor to said input circuit; and means coupling the emitter-electrode of said second transistor to said source of negatve potential;

said means coupling the emitter electrode of said first transistor to said positive DC potential comprising a first diode and said means coupling the emitter electrode of said second transistor to said negative DC potential comprising a second diode.

2. The integrator of claim 1 further comprising a fifth resistor, one end thereof being coupled to the emitter electrode of said first transistor and the other end thereof being coupled to the emitter electrode of said second transistor.

References Cited

UNITED STATES PATENTS

| | | | |
|---|---|---|---|
| 2,917,694 | 12/1959 | Ashcraft | 307—313 |
| 3,160,766 | 12/1964 | Reymond | 307—313 |

ARTHUR GAUSS, *Primary Examiner.*

B. P. DAVIS, *Assistant Examiner.*

U.S. Cl. X.R.

307—313, 318; 328—127